United States Patent
Nekuii et al.

(10) Patent No.: US 10,140,250 B2
(45) Date of Patent: Nov. 27, 2018

(54) METHODS AND APPARATUS FOR PROVIDING AN FFT ENGINE USING A RECONFIGURABLE SINGLE DELAY FEEDBACK ARCHITECTURE

(71) Applicants: Mehran Nekuii, San Jose, CA (US); Hong Jik Kim, San Jose, CA (US)

(72) Inventors: Mehran Nekuii, San Jose, CA (US); Hong Jik Kim, San Jose, CA (US)

(73) Assignee: CAVIUM, San Jose, CA (US)

( * ) Notice: Subject to any disclaimer, the term of this patent is extended or adjusted under 35 U.S.C. 154(b) by 22 days.

(21) Appl. No.: 15/379,207

(22) Filed: Dec. 14, 2016

(65) Prior Publication Data
US 2017/0220523 A1 Aug. 3, 2017

Related U.S. Application Data
(60) Provisional application No. 62/288,382, filed on Jan. 28, 2016.

(51) Int. Cl.
*G06F 17/14* (2006.01)
*H04J 11/00* (2006.01)

(52) U.S. Cl.
CPC ............ *G06F 17/142* (2013.01); *H04J 11/00* (2013.01); *H04J 2211/005* (2013.01)

(58) Field of Classification Search
CPC ...... G06F 17/142; G06F 17/141; H04J 11/00; H04J 2211/005; H04J 2211/00
USPC .......................................... 370/210; 708/404
See application file for complete search history.

(56) References Cited

U.S. PATENT DOCUMENTS

| | | | | | |
|---|---|---|---|---|---|
| 4,241,411 | A * | 12/1980 | Krasner | ................ | G06F 17/142 708/404 |
| 6,061,705 | A * | 5/2000 | Hellberg | ................ | G06F 17/142 708/404 |
| 7,062,523 | B1 * | 6/2006 | Hoffman | ................ | G06F 17/142 708/403 |
| 7,680,870 | B2 * | 3/2010 | Lee | ........................ | G06F 17/142 708/404 |

(Continued)

OTHER PUBLICATIONS

Jang Soohyum, IEICE publication "Area-efficient FFT processor for MIMO-OFDM based SDR systems", Jul. 11, 2013, pp. 1-7.*

*Primary Examiner* — Kwang B Yao
*Assistant Examiner* — Syed M Bokhari
(74) *Attorney, Agent, or Firm* — James M. Wu; JW Law Group

(57) ABSTRACT

Methods and apparatus for providing an FFT engine using a reconfigurable single delay feedback architecture. In one aspect, an apparatus includes a radix-2 (R2) single delay feedback (SDF) stage that generates a radix-2 output and a radix-3 (R3) SDF stage that generates a radix-3 output. The apparatus also includes one or more radix-2 squared (R2^2) SDF stages that generate a radix-4 output. The apparatus further includes a controller that configures a sequence of radix stages selected from the R2, R3, and R2^2 stages based on an FFT point size to form an FFT engine. The FFT engine receives input samples at a first stage of the sequence and generate an FFT output result that is output from a last stage of the sequence. The sequence includes no more than one R3 stage.

22 Claims, 13 Drawing Sheets

(56) References Cited

U.S. PATENT DOCUMENTS

2004/0064493 A1* 4/2004 Kulkarni ............... H04L 27/263
 708/404
2004/0172435 A1* 9/2004 Goel .................... G06F 17/142
 708/404

* cited by examiner

METHODS AND APPARATUS FOR PROVIDING AN FFT ENGINE USING A RECONFIGURABLE SINGLE DELAY FEEDBACK ARCHITECTURE

CLAIM TO PRIORITY

This application claims the benefit of priority based upon U.S. Provisional Patent Application having Application No. 62/288,382, filed on Jan. 28, 2016, and entitled "METHOD AND APPARATUS FOR PROVIDING FFT ENGINE USING SINGLE DELAY FEEDBACK SCHEME," which is hereby incorporated herein by reference in its entirety.

FIELD

The exemplary embodiment(s) of the present invention relates to telecommunications network. More specifically, the exemplary embodiment(s) of the present invention relates to receiving and processing data streams via a communication network.

BACKGROUND

With the rapidly growing trend of mobile and remote data access over high-speed communication networks, such as 3G, 4G, or long term evolution (LTE) cellular services, accurately delivering data becomes increasingly challenging and difficult. The high-speed communication network which is capable of delivering information includes, but not limited to, a wireless network, a cellular network, wireless personal area network ("WPAN"), wireless local area network ("WLAN"), wireless metropolitan area network ("MAN"), or the like. While WPAN can be Bluetooth or ZigBee, WLAN may be a Wi-Fi network in accordance with IEEE 802.11 WLAN standards.

The downlink (and uplink) front end of an LIE base station (or any OFDM-based technology) should be able to perform time to frequency domain conversion (and vice versa) on the received time domain (and transmitted frequency domain) samples. To do the conversion, Discrete Fourier Transform (DFT) is used. The DFT operation may be implemented more efficiently for particular DFT sizes. Those implementations are called Fast Fourier Transform (FFT) and inverse FFT (IFFT), which are commonly used due to their efficient implementation. To support all standard LTE bandwidths, FFT sizes of 128, 256, 512, 1024, 1536, 2048, 3072 and 4096 should be supported.

Therefore, it would be desirable have a mechanism to perform fast Fourier transforms to support all LTE bandwidths in a fast and efficient manner.

SUMMARY

In various exemplary embodiments, a methods and apparatus are provided for efficiently computing FFTs using a reconfigurable single-delay feedback (SDI) architecture. In an exemplary embodiment, a radix factorization is determined to allow an N-point FFT to be computed. A SDF engine is designed to compute one of the radix factors. For example, SDF engines are designed to compute radix-2, radix-3 and radix-4 computations. In an exemplary embodiment, the SDF engines are combined into an overall reconfigurable architecture that includes a plurality of inputs allowing FFT computations all LTE bandwidths to be computed. For example, in an exemplary embodiment, the SDF architecture supports all LTE bandwidths, which include FFT point sizes of 128, 256, 512, 1024, 1536, 2048, 3072 and 4096.

In one embodiment, an apparatus is disclosed that performs FFTs using radix-2 and radix-3 SDF engines. For example, the apparatus is suitable to supports all LTE bandwidths, which include FFT sizes of 128, 256, 512, 1024, 1536, 2048, 3072 and 4096. The apparatus comprises a first two radix-2 ("R2^2") engine that is coupled to a first buffer having a capacity of storing 2048 samples, a second R2^2 engine is coupled to a second buffer with a capacity of storing 1024 samples, and a the third R2^2 engine coupled to a third buffer having a capacity of storing 512 samples. The apparatus also comprises a fourth R2^2 engine coupled to a fourth buffer having a capacity of storing 256 samples, a fifth R2^2 engine coupled to a fifth buffer with a capacity of storing 128 samples, and a sixth R2^2 engine coupled to a sixth buffer having a capacity of storing 64 samples. The apparatus includes a plurality of input ports where each input port is designed to receive an input sample sequence for a particular FFT size.

In an alternative aspect, an apparatus includes a set of radix-2 SDF engines and at most one radix-3 SDF engine that correspond to factors in a radix factorization. The SDF engines are combined in a sequence such that the radix-3 engine is preferably in the first position.

In an exemplary embodiment, an apparatus is provided that includes a radix-2 (R2) single delay feedback (SDF) stage that generates a radix-2 output and a radix-3 (R3) SDF stage that generates a radix-3 output. The apparatus also includes one or more radix-2 squared (R2^2) SDF stages that generate a radix-4 output. The apparatus further includes a controller that configures a sequence of radix stages selected from the R2, R3, and R2^2 stages based on an FFT point size to form an FFT engine. The FYI engine receives input samples at a first stage of the sequence and generate an FFT output result that is output from a last stage of the sequence. The sequence includes no more than one R3 stage. In another embodiment, the sequence includes no more than one R2 stage.

In an exemplary embodiment, a method is provided that includes the operations of determining an FFT point size of a FFT output result to be computed and factoring the point size into a factorization having factors of 2, 3, and 4. The method also includes an operation of configuring a sequence of radix stages selected from R2, R3, and R2^2 single delay feedback (SDF) stages corresponding to the factors of the factorization to form an FFT engine. The FFT engine receives input samples at a first stage of the sequence and generates the FFT output result that is output from a last stage of the sequence. The sequence includes no more than one R3 stage.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
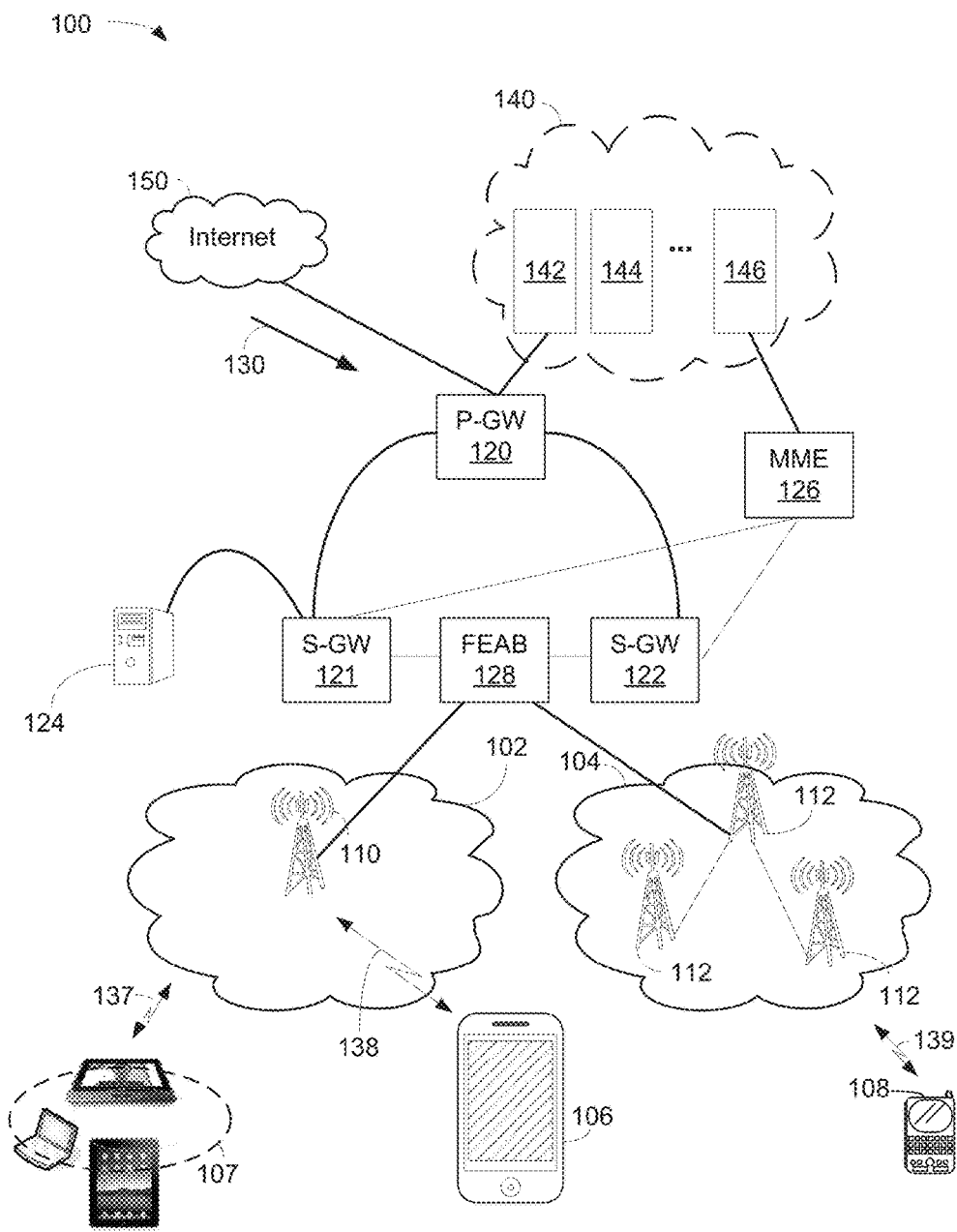
FIG. 1 shows a block diagram illustrating a communication network comprising a FEAB having an exemplary embodiment of an efficient FFT engine in accordance with one embodiment of the present invention.

Exemplary embodiments of the present invention are described here in the context of a method and/or apparatus for providing an enhanced fast Fourier transform ("FFT") engine using a reconfigurable single delay feedback ("SDF") architecture to support all LTE bandwidths in a fast and efficient manner.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB ("eNodeB"), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UNITS known as LTE (Long Term Evolution), or DVB-H (Digital Video Broadcasting-Handhelds)), or a hybrid (satellite and terrestrial) network.

FIG. 1 shows a block diagram illustrating a communication network 100 comprising an exemplary embodiment of an efficient FFT engine in accordance with one embodiment of the present invention. Communication network 100 includes packet data network gateway ("P-GW") 120, two serving gateways ("S-GWs") 121-122, two base stations (or cell sites) 102-104, server 124, and Internet 150. P-GW 120 includes various components 140 such as billing module 142, subscribing module 144, tracking module 146, and the like to facilitate routing activities between sources and destinations. It should be noted that the underlying concept of the exemplary embodiment(s) of the present invention would not change if one or more blocks (or devices) were added to or removed from diagram 100.

The network configuration of the communication network 100 may also be referred to as a third generation ("3G"), 4G, LTE, 5G, or combination of 3G and 4G cellular network configuration. MIME 126, in one aspect, is coupled to base stations (or cell site) and S-GWs capable of facilitating data transfer between 3G and LTE (long term evolution) or between 2G and LTE. MME 126 performs various controlling/managing functions, network securities, and resource allocations.

S-GW 121 or 122, in one example, coupled to P-GW 120, MME 126, and base stations 102 or 104, is capable of routing data packets from base station 102, or eNodeB, to P-GW 120 and/or MIME 126. A function of S-GW 121 or 122 is to perform an anchoring function for mobility between 3G and 4G equipment. S-GW 122 is also able to perform various network management functions, such as terminating paths, paging idle UEs, storing data, routing information, generating replica, and the like.

P-GW 120, coupled to S-GWs 121-122 and Internet 150, is able to provide network communication between user equipment ("UE") and IP based networks such as Internet 150. P-GW 120 is used for connectivity, packet filtering, inspection, data usage, billing, or PCRF (policy and charging rules function) enforcement, et cetera. P-GW 120 also provides an anchoring function for mobility between 3G and 4G (or LTE) packet core network(s).

Base stations 102-104 are coupled to front end accelerator block (FEAR) 128, which is also known as cell site, node B, or eNodeB. Base stations 102-104 include one or more radio towers 110 or 112. Radio tower 110 or 112 is further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Base station 102 facilitates network communication between mobile devices such as UEs 106-107 with S-GW 121 via radio towers 110. It should be noted that base station or cell site can include additional radio towers as well as other land switching circuitry.

In one aspect, FEAB 128 is able to process wireless data using FFTs with an exemplary embodiment of an FFT engine comprising a reconfigurable SDF architecture to enhance FFT efficiency. A detailed description of the exemplary embodiments of the reconfigurable SDF architecture and operation is provided below.

Figure 2:
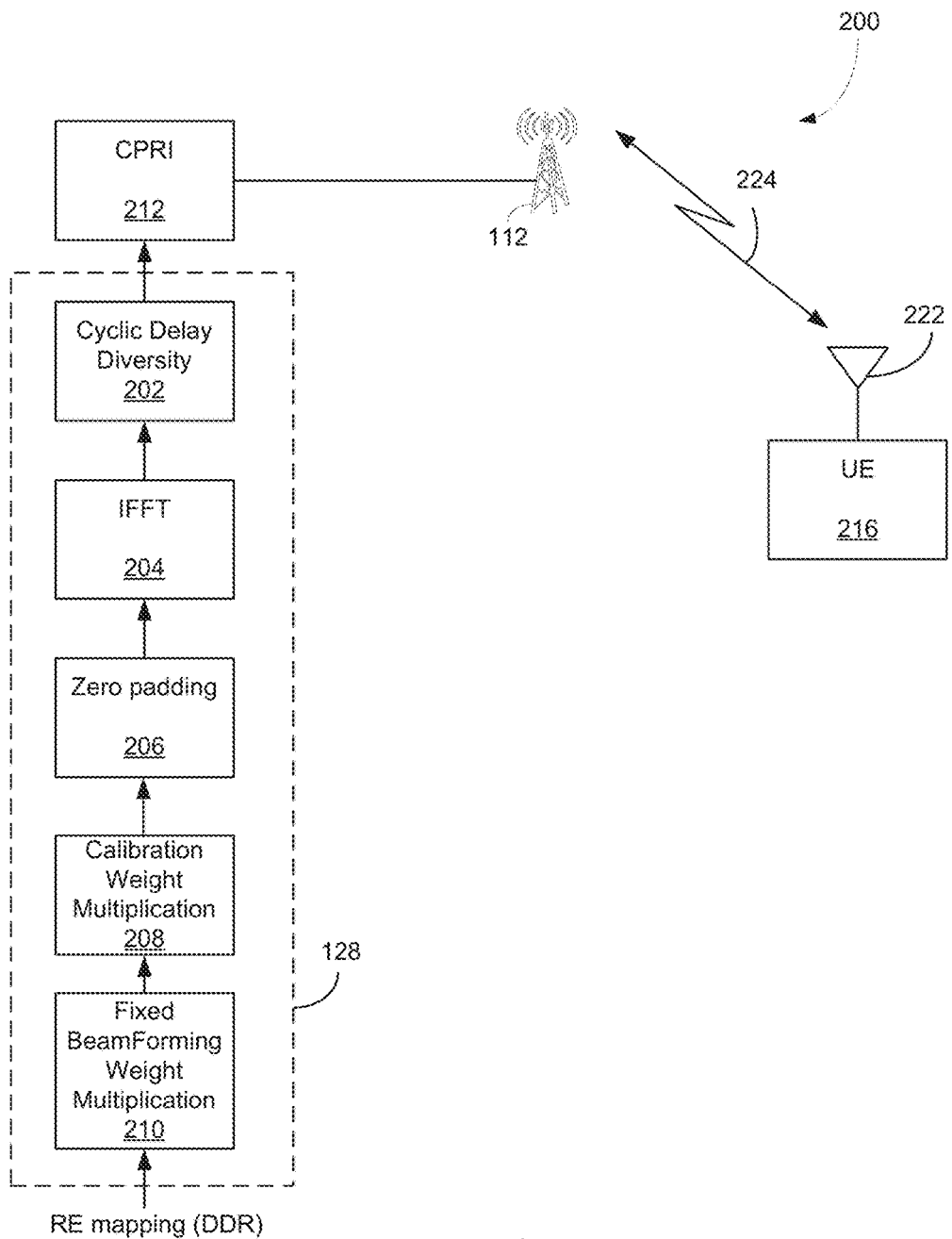
FIG. 2 shows a block diagram illustrating a down link comprising an exemplary embodiment of the FEAB shown in FIG. 1.

FIG. 2 shows a block diagram illustrating a down link 200 comprising an exemplary embodiment of the FEAB 128 shown in FIG. 1. The FEAB 128 comprises an exemplary embodiment of an efficient FFT engine having a reconfigurable SDF architecture in accordance with one embodiment of the present invention. The down link 200 includes CPRI (Common Public Radio Interface) 212, radio tower 112, and UE 216 wherein UE 216 includes an antenna 222. The LE 216 is coupled via radio tower 112 using wireless signals 224. It should be noted that the underlying concept of the exemplary embodiment(s) of the present invention would not change if one or more blocks (or devices) were added to or removed from the down link 200.

In one aspect, FEAR 128 includes cyclic delay diversity module 202, IFFT 204, zero padding module 206, calibration weight multiplication 208, and fixed BF weight multiplication 210. In one aspect, FEAB 128 is the last major block in the downlink processing chain, preceding RFIF. It processes the frequency mapped resource elements (REs) corresponding to all transmit antennas and sectors, and generates the time domain samples to be processed and transmitted by the CPRI 212.

Accelerator block 128 illustrates a high level block diagram of a downlink front end (DUE) for a single sector. After reading REs from physical (SMEM/DDR) memory, beam forming (e.g., 210) and calibration weight multiplication (e.g., 208) are performed on the subcarriers. Then they are zero padded and sent to IFFT block which transforms the samples to time domain. After that, signal scaling, Cyclic Delay Diversity (CDD), CP addition and time domain windowing are performed, before feeding the samples to RFIF. This process is repeated for all sectors.

Fixed beamforming weight multiplication 210 is used per sector for supporting 2 Tx, 4 Tx and 8 Tx antenna configurations. It should be noted that different configurations for different sectors relating to BW, CP type (normal and extended), number of antennas, duplex mode, and subcarrier spacing can be used. Calibration is used to nullify the spectrum impairments from hardware components in transmitter path. Note that supported number of antennas can be up to 48.

In one embodiment, IFFT engine 204 is configured to support 128, 256, 512, 1024, 1536, 2048, 3072 and 4096 point IFFT. Support for special subframes with 7.5 KHz is used as subcarrier spacing (used in MBSFN channel). Cyclic delay diversity (CDD) exploits additional timing diversity. Time domain windowing can suppress out of band spectrum leakage at symbol boundaries. TSSI (Transmitter Signal Strength Indication) can be calculated. Bypass mode support is used for bypassing 1 or several sector samples directly from Read DMA port to RFIF. The number of control symbols per subframe can be one of either 0, 1, 2, 3 or 4.

The downlink (and uplink) front end of an LTE base station (or any OFDM-based technology) should be able to perform time to frequency domain conversion (and vice versa) the received time domain (and transmitted frequency domain) samples. To do the conversion, Discrete Fourier Transform (DFT) is used. DFT operation could be implemented more efficiently for particular DFT sizes. Those implementations are called Fast Fourier Transform (FFT) and Inverse FFT (IFFT) which are commonly used due to their efficient implementation. To support all standard LTE bandwidths, FFT sizes of 128, 256, 512, 1024, 1536, 2048, 3072 and 4096 should be supported.

In various exemplary embodiments, a novel and efficient FFt engine comprising a reconfigurable SDF architecture is provided to support LTE FFT sizes with a specific mixture of radix-2, radix-3, and radix-4 configurations. In an exemplary embodiment, the FFT engine with reconfigurable SDF architecture is included in the IFFT engine 204. In another exemplary embodiment, the FFT engine with reconfigurable SDF architecture is included in an FFT engine of a transmitter not shown in FIG. 2.

It is desirable that FFT processing be done very efficiently as this is one of the highest complexity modules in OFDM baseband processing. In addition, the design of the FIT system should be flexible enough to support multiple FFT lengths corresponding to multiple transmission bandwidths utilized in LTE communications. It will be assumed that the input samples to the FFT/IFFT engine are:

$$x(n), n=0, 1, \ldots, N-1$$

in which, N is the FFT length, which can be decomposed as $N=2^p \times 3^q$. Here, for the LIE case, q could be 0 or 1 and p could be 7, 8, . . . , 11 or 12.

To perform the time/frequency conversion operation, Discrete Fourier Transform (DFT) is used. The DFT output $X(k)$, $k=0, 1, \ldots, N-1$, can be obtained as:

$$X(k) = \frac{1}{N}\sum_{n=0}^{N-1} x(n) W_N^{nk}, k = 0, \ldots, N-1$$

where for DFT operation $W_N$ is defined as $$W_N \triangleq e^{-\frac{j2\pi}{N}}$$

and for Inverse DFT (IDFT) operation $W_N$ is defined as $$W_N \triangleq e^{\frac{j2\pi}{N}}.$$

Figure 3A:
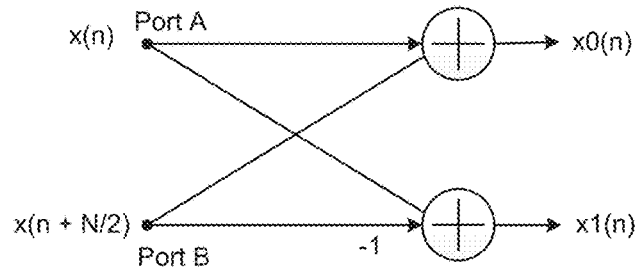
FIGS. 3A-C show exemplary embodiments of radix-2 and radix-2^2 butterfly configurations in accordance with one embodiment of the present invention.
Figure 3B:
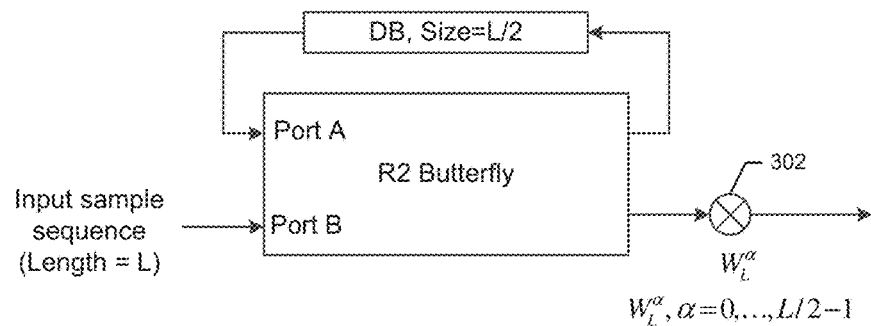
Figure 3C:
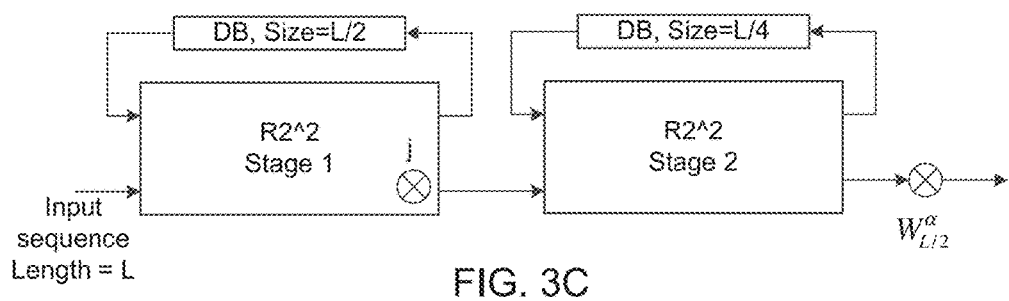

FIGS. 3A-C show exemplary embodiments of radix-2 and radix-2-squared (radix-2^2) butterfly configurations in accordance with one embodiment of the present invention. In one embodiment, implementation of the DFT operation is obtained by rewriting the DFT operation as if decimation in frequency (or in time) is performed. If size N has a factor of 2 then the DFT can be re-written as follows:

$$X(2r) = \frac{1}{N}\sum_{n=0}^{\frac{N}{2}-1}\left[x(n)+x\left(n+\frac{N}{2}\right)\right]W_{\frac{N}{2}}^{nr}, r=0,\ldots,\frac{N}{2}-1$$

$$X(2r+1) = \frac{1}{N}\sum_{n=0}^{\frac{N}{2}-1}\left[x(n)-x\left(n+\frac{N}{2}\right)\right]W_N^n W_{\frac{N}{2}}^{nr}, r=0,\ldots,\frac{N}{2}-1$$

This means the DFT result can be obtained by feeding the input samples x(n) to a radix-2 butterfly and then the result could be obtained by performing two DFTs of size N/2 in pipeline over the two outputs of this radix-2 butterfly.

FIG. 3A shows an exemplary embodiment of a butterfly configuration for performing a radix-2 computation. During operation, a first half of the input samples is input to port A and a second half of the input samples is input to port B. The samples are appropriately weighted and summed to obtain the radix-2 output results.

FIG. 3B show an exemplary embodiment of a radix-2 butterfly implemented in a radix-2 single-delay feedback (SDF) configuration. The radix-2 SDF configuration comprises a delay buffer of size $N_i$ (where $2N_i$=L is the size of the input sample sequence). The input data stream is fed sequentially to the radix-2 SDF at port B. The delay buffer (DB) stores the first half of the input sample sequence. The delay buffer then outputs the first half of the input sampled to the upper input (port A) of the radix-2 SDF. The second half of the input sample sequence is fed to the lower input (port B) of the radix-2 SDF so that the first and second halves of the input sample sequence can be combined to calculate the radix-2 result. The result from the lower part of the butterfly is fed directly to the next stage, whereas the second half is stored back into the delay buffer. Those stored samples are then fed to the next block immediately after the first half is transferred. The second half of the result should also be multiplied with the twiddle factors 302 that are defined as follows.

$$W_{2N_i}^\alpha, \alpha=0,\ldots,N_i-1$$

Essentially the radix-2 SDF configuration shown in FIG. 3B makes the same calculations that are performed in the radix-2 butterfly configuration shown in FIG. 3A, where the input samples are appropriately weighted and summed to obtain the correct result.

FIG. 3C show an exemplary embodiment of a radix-2^2 SDF configuration. Two radix-2 SDF stages (each as shown in FIG. 3B) are merged as shown in FIG. 3C to form the radix-2^2 configuration to perform a radix-4 operation. In this radix-2^2 configuration, the twiddle factors are applied at the output of the second stage radix-2 engine. As shown in FIG. 3C, the output samples from the first stage are multiplied by (j) if both stages are used to perform a radix-4 operation. If both stages not used, the output of the first stage is not multiplied by (j) and only the twiddle factors at the output of the second stage are applied. Using both stages together performs a radix-4 operation, and using only the second stage performs a radix-2 operation.

If N has a factor of 3 then then the following equations can be used to compute the DFT.

$$X(3r) = \frac{1}{N}\sum_{n=0}^{\frac{N}{3}-1}\left[x(n)+x\left(n+\frac{N}{3}\right)+x\left(n+\frac{2N}{3}\right)\right]W_{\frac{N}{3}}^{nr},$$

$$r=0,\ldots,\frac{N}{3}-1$$

$$X(3r+1) = \frac{1}{N}\sum_{n=0}^{\frac{N}{3}-1}\left[x(n)+x\left(n+\frac{N}{3}\right)W_3^1+x\left(n+\frac{2N}{3}\right)W_3^{-1}\right]W_N^n W_{\frac{N}{3}}^{nr},$$

$$r=0,\ldots,\frac{N}{3}-1$$

$$X(3r+2) = \frac{1}{N}\sum_{n=0}^{\frac{N}{3}-1}\left[x(n)+x\left(n+\frac{N}{3}\right)W_3^{-1}+x\left(n+\frac{2N}{3}\right)W_3^1\right]W_N^{2n} W_{\frac{N}{3}}^{nr},$$

$$r=0,\ldots,\frac{N}{3}-1$$

Figure 4A:
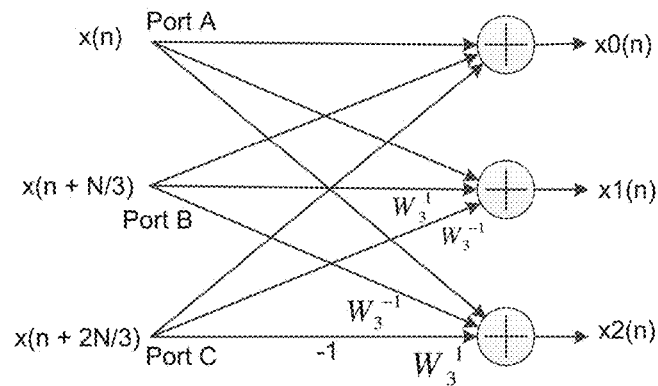
FIGS. 4A-B show exemplary embodiments of radix-3 butterfly architectures in accordance with one embodiment of the present invention.

FIG. 4A shows an exemplary embodiment of a butterfly configuration for performing a radix-3 computation. Similar to the radix-2 configuration, the input samples x(n) can be input to the radix-3 butterfly and then the final DFT result would be obtained by performing three pipelined DFTs of size N/3 over the three outputs of this radix-3 butterfly.

Figure 4B:
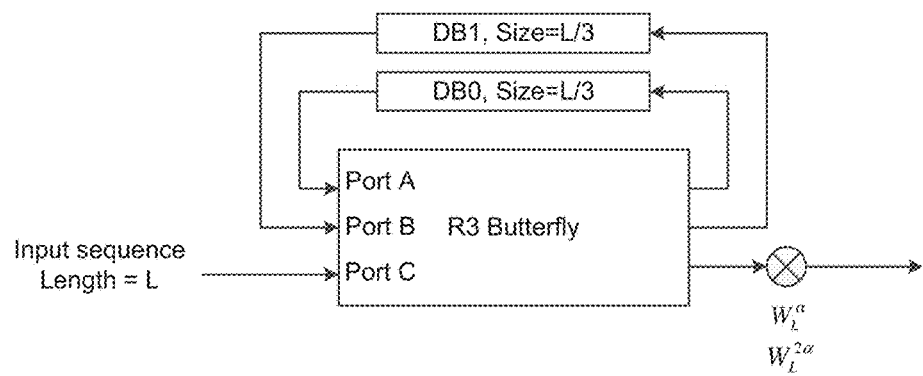

FIG. 4B show an exemplary embodiment of a radix-3 butterfly implemented in a radix-3 SDF configuration. For example, the input samples are received at port C and the first third of the samples are stored in the delay buffer DB0. A second third of the samples received at port C are stored in the delay buffer DB1. After the first and second thirds of the samples have been stored, the buffers feed port A and port B of the butterfly with the stored samples while the remaining third of the samples are input to port C. Essentially the same calculations are made as in the butterfly configuration shown in FIG. 4A, where the input samples are appropriately weighted and summed to obtain the correct result.

The radix-3 SDF configuration in FIG. 4B has two delay buffers each with size $N_i$ where $3N_i$=L is the size of the input sequence samples. The input samples are divided into 3 groups. The first 2 groups are stored into the two delay buffers and are used together with the last group to obtain the radix-3 butterfly results. The result from the lower butterfly port is directly fed to the next stage, while the second and third port outputs are stored back in the delay buffers. In an exemplary embodiment, samples from delay buffer 0 are multiplied with the following twiddle factors before feeding them to the next stage.

$$W_{3N_i}^\alpha, \alpha=0,\ldots,N_i-1$$

In an exemplary embodiment, the second delay buffer samples are multiplied with the following twiddle factors.

$$W_{3N_i}^{2\alpha}, \alpha=0,\ldots,N_i-1$$

Some advantages of the SDF engines above are their low memory utilization (minimizing chip area and power consumption) and low initial delay, thus allowing FFTs to be computed while keeping the number of radix engines at a minimum.

Exemplar Architecture

In certain circumstances, the DFT size only has factors of 2 or 3 (e.g., $N=2^p \times 3^q$). In this case, smaller pipelined DFT operations can be further simplified into deeper pipelined operations using the SDF configurations described above.

FIGS. 5-10 show exemplary embodiments of FFT engines having reconfiguration SDF configurations that use radix-2, radix-2^2 and radix-3 SDF configurations in accordance with the invention. In various exemplary embodiments, the FFT engines comprise SDF configurations to support any FFT sizes with factors of 2 and 3, that is $N=2^p \times 3^q$.

Figure 5:
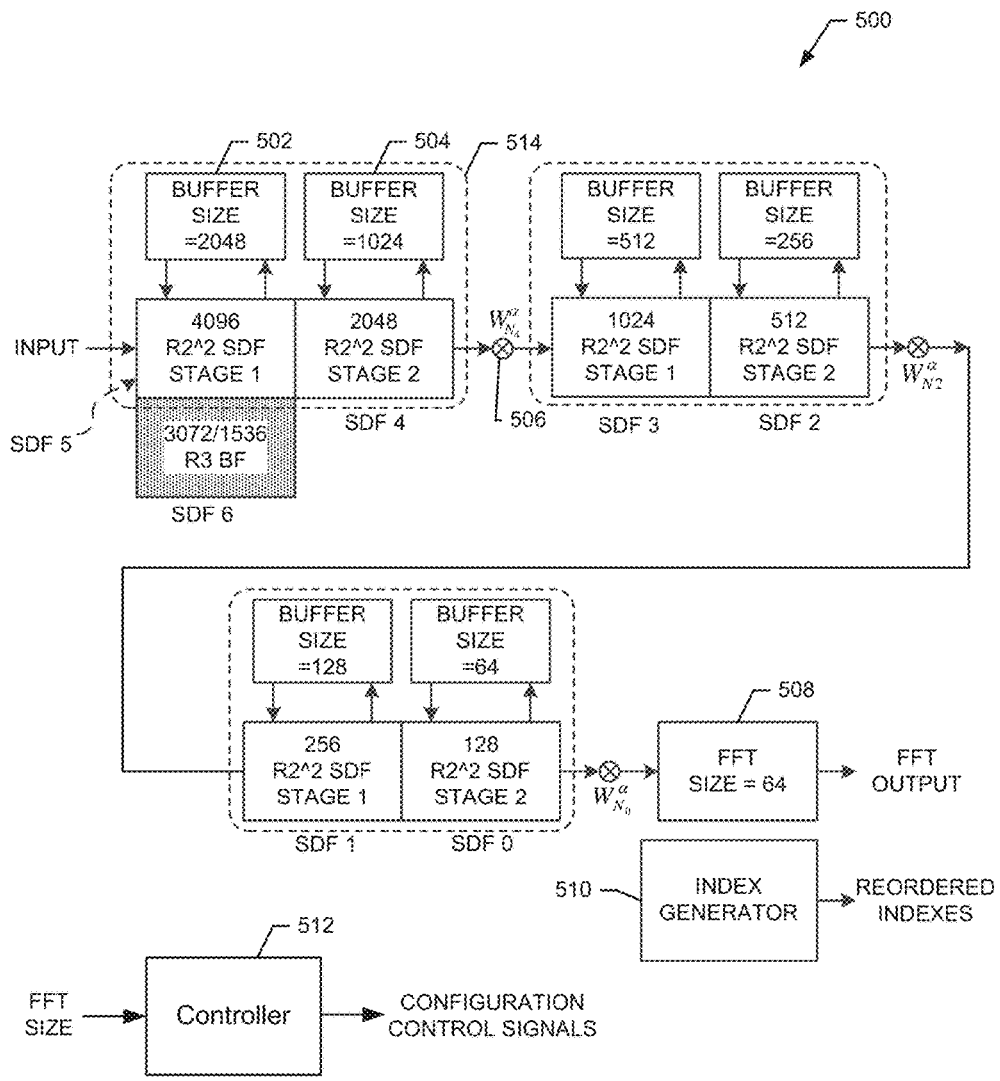
FIG. 5 shows an exemplary embodiment of an FFT engine having a reconfigurable SDF architecture in accordance with one embodiment of the present invention.

FIG. 5 shows an exemplary embodiment of an FFT engine 500 having a reconfigurable SDF architecture in accordance with one embodiment of the present invention. The FFT engine 500 is capable of supporting LTE FFT sizes of 128, 256, 512, 1024, 1536, 2048, 3072 and 4096. In an exemplary embodiment, the FFT engine 500 comprises R2^2-SDF and R3-SDF configurations (where the SDF engines are labeled as SDF6 through SDF0). For example, the R2^2 stages SDF5 and SDF4 form one complete 2^2 configuration 514 that is similar to the R2^2 configuration shown in FIG. 3C. Depending on the FFT size requirements, the input sample sequence is fed into a selected one of the SDF configurations as described below.

The number shown on each SDF configuration indicates the input sequence sample length (the FFT size to be computed) if that SDF configuration is used as the starting stage. Each SDF configuration has a delay buffer with a buffer size shown within the buffer. It should be noted that the SDF5 and SDF6 configurations share the same buffer 502 (with a size of 2048 samples). It should be noted that while the R3 SDF configuration is shown as an input stage, in other exemplary embodiments, the R3 SDF configuration can be located at any other stage of the FFT computation In an exemplary embodiment, various FFT sizes are supported by the FFT engine 500 as follows.

FFT Size=4096

To compute an FFT size of 4096, the input sample sequence is input to the SDF5 configuration (stage 1 of R2^2). During operation, the entire buffer size of 2048 samples is used. The output of the SDF5 configuration flows to the SDF4 configuration and so forth through all the remaining SDF configurations including SDF0. A final block 508 performs a 64-point FFT on the output of the SDF0 configuration to determine the final output of the 4096 point FFT. In an exemplary embodiment, the block 508 comprises three R2^2 configurations to perform the 64-point FFT.

FFT Size=2048

To compute an FFT size of 2048, the input sample sequence is input to the SDF4 configuration (stage 2 of R2^2) that uses the buffer 504 that stores 1024 samples. The SDF5 configuration (e.g., stage 1 of R2^2) is bypassed. The output of the SDF4 configuration flows to the SDF3 configuration and so forth through all the remaining configurations including SDF0. The final block 508 performs a 64-point FFT to determine the final output of the 2048 point FFT.

FFT Size=3072

To compute an FFT size of 3072, the input sequence is input to the R3 SDF configuration SDF6. The delay buffer 502 of size 2048 is divided into two delay buffers each with size 1024 to be used with the radix-3 SDF of SDF6. In this configuration, the SDF4 engine is bypassed and after a twiddle factor multiplication operation 506, the samples output from the SDF6 configuration are input to the SDF3 configuration. The output of the SDF3 configuration flows to the SDF2 configuration and so forth through all the remaining SDF configurations including SDF0. A final block 508 performs a 64-point FFT to determine the final output of the 3072 point FFT.

FFT Size 1536

To compute an FFT size of 1536, the input sequence is input to the R3 SDF configuration SDF6. The delay buffer 502 of size 2048 is partitioned into two delay buffers each with size 512 and an extra 1024 sample buffer (which will not be used by this stage). The two 512 sample buffers will be used with the radix-3 SDF6 configuration. The SDF4 and SDF3 configurations are bypassed and the output samples from SDF6 configuration are multiplied with the twiddle factors at 506 and input to the SDF2 configuration (stage 2 of R2^2). The output of the SDF2 configuration flows to the SDF1 configuration and so forth through all the remaining configurations including SDF0. The final FFT block 508 performs a 64-point FFT to determine the final output of the 1536 point FFT.

FFT Size=1024

To compute an FFT size of 1024, the SDF6, SDF5 and SDF4 configurations are bypassed and the input sample sequence is input to the SDF3 configuration (stage 1 of R2^2). The output of the SDF3 configuration flows to the SDF2 configuration (stage 2 of R2^2) and so forth through all the remaining configurations including SDF0. The final block 508 performs a 64-point FFT to determine the final output of the 1024 point FFT.

FFT Size=512

To compute an FFT size of 512, the SDF6, SDF5, SDF4 and SDF3 configurations are bypassed and the input sample sequence is input to the SDF2 configuration (stage 2 of R2^2). The output of the SDF2 configuration flows to the SDF1 configuration whose output flows to the SDF0 configuration. The final block 508 performs a 64-point FFT to determine the final output of the 512 point FFT.

FFT Size=256

To compute an FFT size of 256, the SDF6, SDF3 and SDF2 configurations are bypassed and the input sample sequence is input to the SDF1 configuration (stage 1 of R2^2). The output of the SDF1 configuration flows to the SDF0 configuration. The final block 508 performs a 64-point FFT to determine the final output of the 256 point FFT.

FFT Size=128

To compute an FFT size of 256, the SDF6, SDF2 and SDF1 configurations are bypassed and the input sample sequence is input to the SDF0 configuration (stage 2 of R2^2). A final block 608 performs a 64 point FFT to determine the final output of the 128 point FFT.

The final output block 508 performs a 64-point FFT. This block can be designed as either a stand-alone radix-64 engine or a mix of smaller radix engines (e.g., combination of 3 R2^2 SDF configurations). Also shown is a controller 512 that receives FFT size parameters and outputs configuration control signals that control the configuration of the FFT engine 500 and the stages at which the input sample sequence is applied. Also shown is an index generator 510 that generates re-ordered indexes that are used to store the FFT results into memory. A more detailed description of the index generator 510 is provided below.

Figure 6:
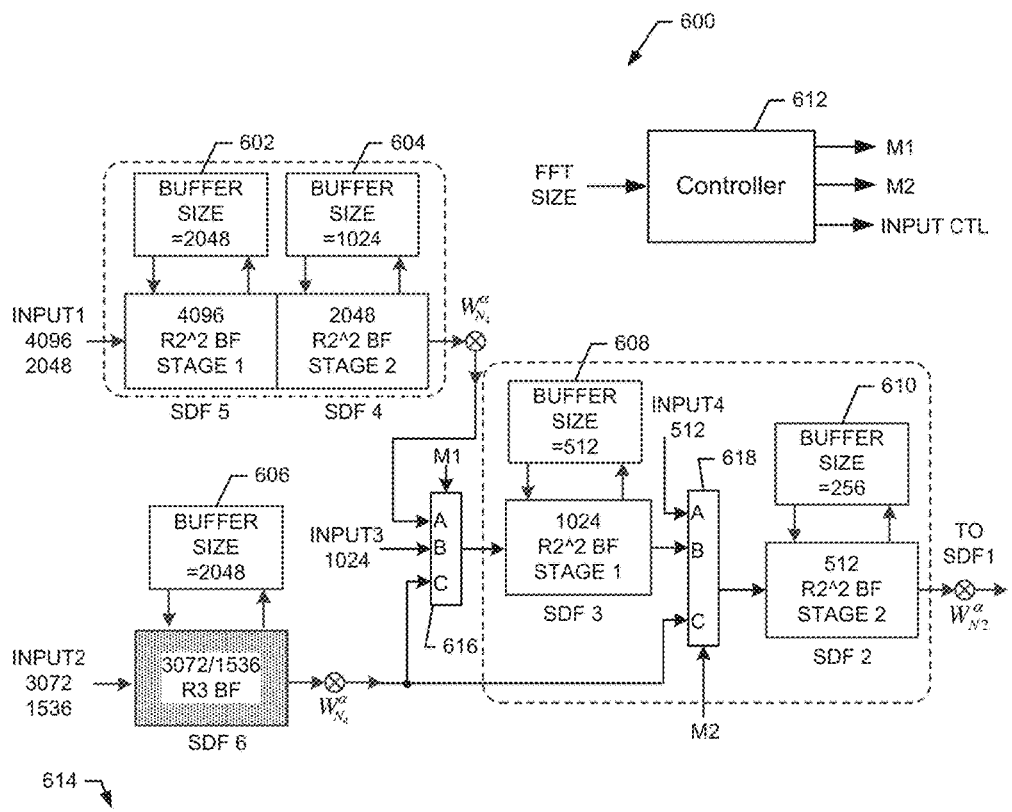
FIG. 6 shows an exemplary embodiment of an FFT engine having a reconfigurable SDF architecture in accordance with one embodiment of the present invention.

FIG. 6 shows another exemplary embodiment of an FFT engine 600 having a reconfigurable SDF architecture in accordance with one embodiment of the present invention. In an exemplary embodiment, the FFT engine 600 includes SDF stages SDF6 through SDF2. The FFT engine 600 also includes multiplexer 616, multiplexer 618, and controller 612. Each of the multiplexers 616 and 618 operates to select one of three inputs to pass to its output based on control signals M1 and M2 output from the controller 612.

In an exemplary embodiment, the controller 612 comprises at least one of a processor, CPU, state machine, memory, ROM, discrete logic and/or other suitable hardware. The controller 612 receives FFT size parameters and uses these values to generate mux control signals (M1 and M2) that control which of three inputs will be output from each of the multiplexers 616 and 618. The controller 612 also generates an input control signal that controls which SDF stage will receive the input sample sequence.

Table 614 shows the selection settings for the values input selection, M1, and M2. As illustrated in Table 614, to compute an FFT of a selected size, a corresponding input 620 is used to receive the input sample sequence at a selected SDF stage 622. The M1 and M2 selection signals control the multiplexers 616 and 618 to output selected mux in signals as shown at 624 and 626. Based on the SDF configuration, one or more SDF stages may be bypassed or not used as indicated at 628.

Therefore, the FFT engine 600 illustrates one exemplary embodiment of a reconfigurable SDF architecture in accordance with the present invention. The output of the FFT engine 600 can be input to the SDF1 stage shown in FIG. 5 to complete the FFT computation.

FIGS. 7-10 show exemplary alternative embodiments of FFT engines having reconfigurable SDF architectures to perform an N-point DFT in accordance with the invention. The FFT engines shown in FIGS. 7-10 illustrate alternative configurations having R2^2-SDF and/or R3-SDF configurations in accordance with the present invention.

Figure 7:
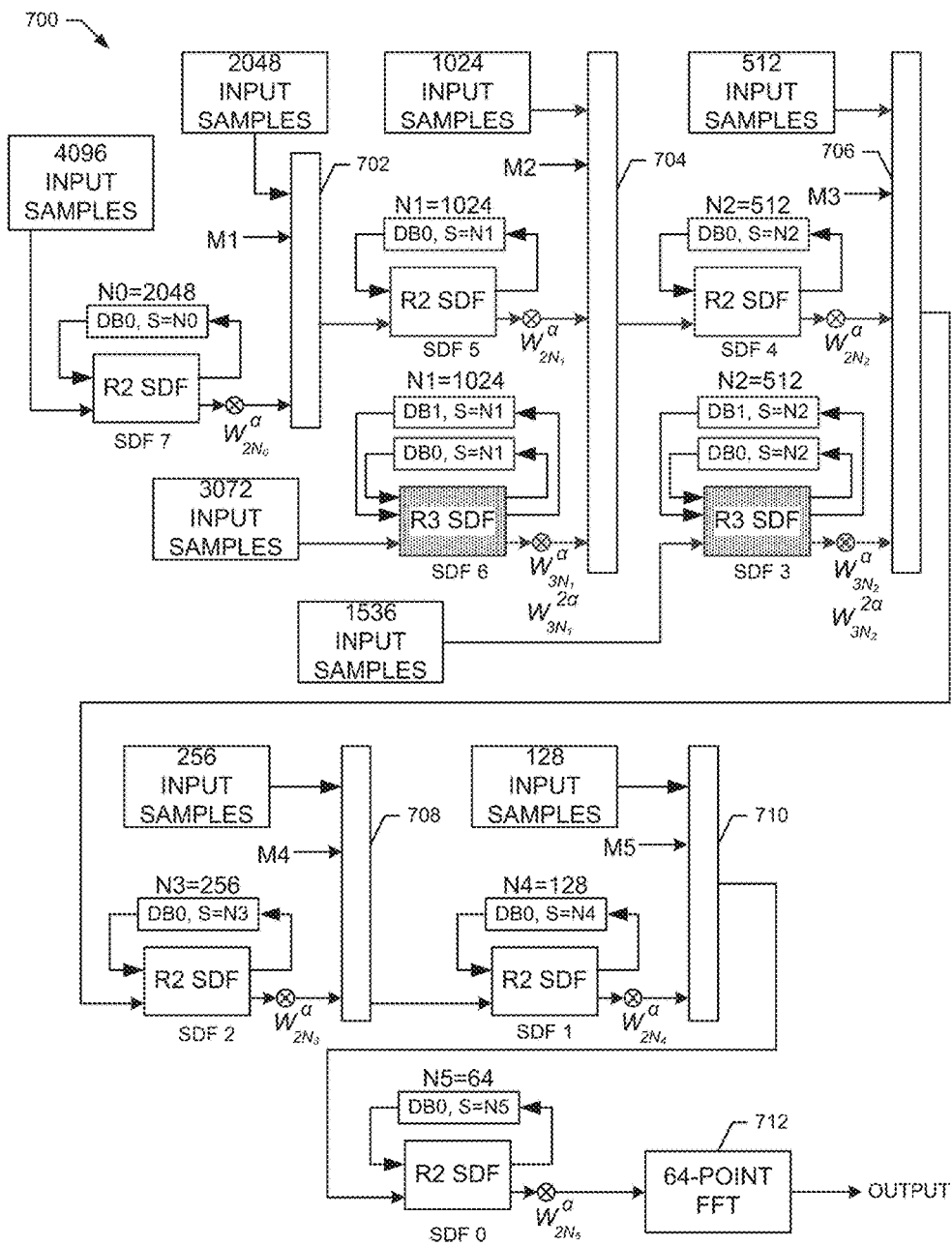
FIG. 7 shows an exemplary embodiment of an FFT engine having a reconfigurable SDF architecture in accordance with one embodiment of the present invention.

FIG. 7 shows an exemplary embodiment of an FFT engine 700 having a reconfigurable SDF architecture in accordance with one embodiment of the present invention. The FFT architecture 700 comprises multiplexers 702, 704, 706, 708, and 710, which multiplex various radix results between SDF radix stages to perform the appropriate radix calculations to obtain the desired FFT result. For example, the mux control signals M1-M5 shown in FIG. 7 can be generated by the controller 612 shown in FIG. 6. Furthermore, the input sample sequence can be applied to any selected SDF stage under the control of the controller 612.

It should also be noted that the FFT architecture 700 comprise two R3-SDF configurations, which are identified as SDF6 and SDF3. However, during any particular FFT computation only one of the R3-SDF configuration is used. For example, the compute a 3072 point FFT, SDF6 is utilized, and to compute a 1536 point FFT, SDF3 is utilized. Otherwise, SDF6 and SDF3 are bypassed.

In an exemplary embodiment, the FFT architecture is configured to compute FFT results for input sample sequence lengths of 4096, 3072, 1536, 1024, 512, 256, and 128 samples. During operation, the multiplexers are set to route radix results to the appropriate SDF stages. For example, to compute a 4096 point FFT the multiplexers are set to configure the FFT engine 700 so that the sequence of SDF stage is: SDF7 (R2), SDF5 (R2), SDF4 (R2), SDF2 (R2), SDF1 (R2), SDF0 (R2), and FFT block 712 (R64). Thus, the sequence of radix computations results in (2*2*2*2*2*2*64)=4096. For example, to compute a 3072 point FFT the multiplexers are set to reconfigure the FFT engine 700 so that the sequence of SDF stages is: SDF6, SDF4, SDF2, SDF1, SDF0, and FFT block 712. For example, to compute a 2048 point FFT the multiplexers are set to reconfigure the FFT engine 700 so that the sequence of SDF stages is: SDF5, SDF4, SDF2, SDF1, SDF0, and FFT block 712. For example, to compute a 1536 point FFT the multiplexers are set to reconfigure the FFT engine 700 so that the sequence of SDF stages is: SDF3, SDF2, SDF1, SDF0, and FFT block 712. For example, to compute a 1024 point FFT the multiplexers are set to reconfigure the FFT engine 700 so that the sequence of SDF stages is: SDF4, SDF2, SDF1, SDF0, and FFT block 712. For example, to compute a 512 point FFT the multiplexers are set to reconfigure the FFT engine 700 so that the sequence of SDF stages is: SDF2, SDF1, SDF0, and FFT block 712. For example, to compute a 256 point FFT the multiplexers are set to reconfigure the FFT engine 700 so that the sequence of SDF stages is: SDF1, SDF0, and FFT block 712. For example, to compute a 128 point FFT the multiplexers are set to reconfigure the FFT engine 700 so that the sequence of SDF stage is: SDF0 and FFT block 712.

Figure 8:
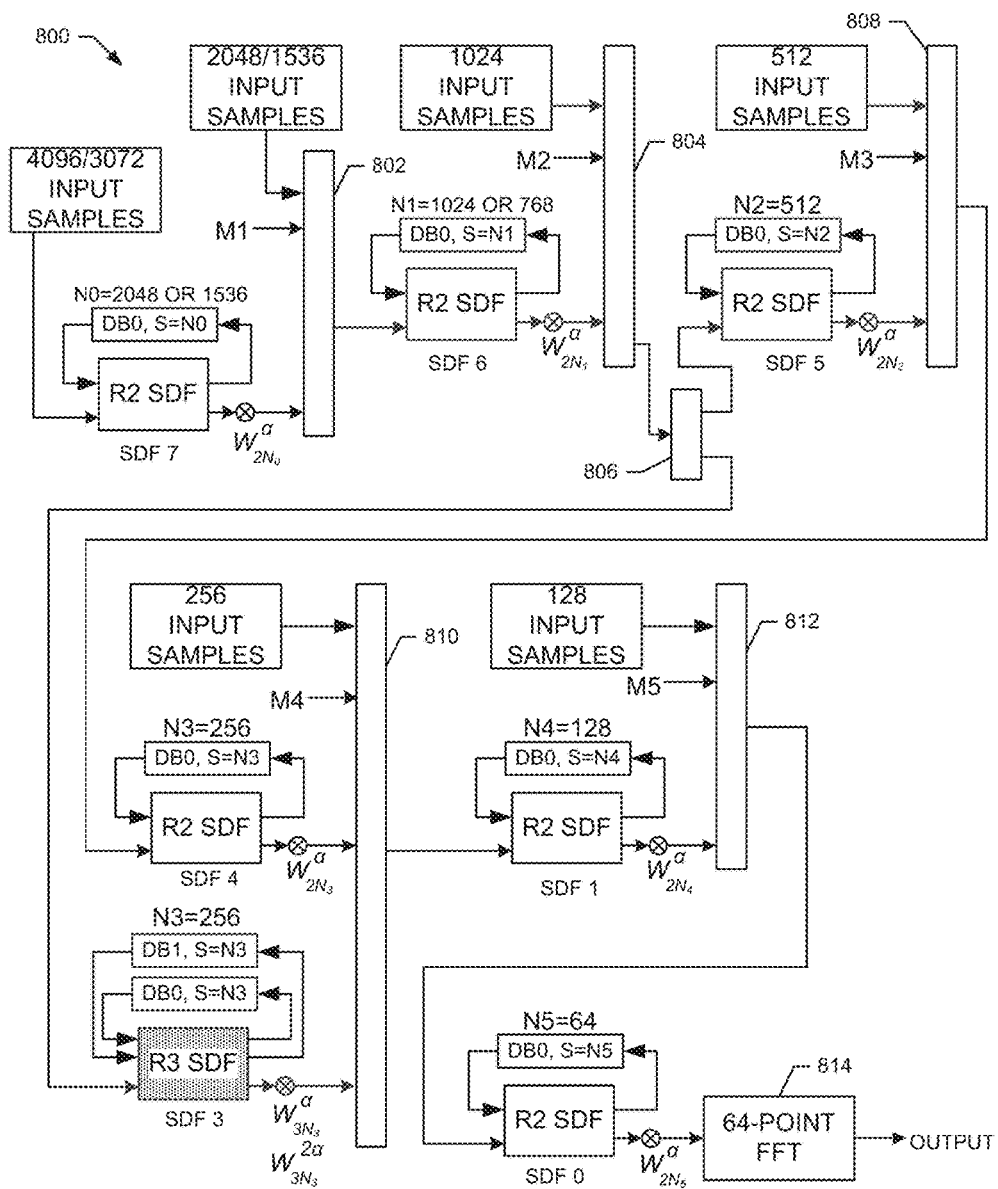
FIG. 8 shows an exemplary embodiment of an FFT engine having a reconfigurable SDF architecture in accordance with one embodiment of the present invention.

FIG. 8 shows an exemplary embodiment of an FFT engine 800 having a reconfigurable SDF architecture in accordance with one embodiment of the present invention. The FFT engine 800 comprises multiplexers 802, 804, 806, 808, 810, and 812, which multiplex various radix results between radix SDF stages to perform the appropriate radix calculations to obtain the desired FFT result. For example, the mux control signals M1-M5 shown in FIG. 8 can be generated by the controller 612 shown in FIG. 6. Furthermore, the input sample sequence can be applied to any selected SDF stage under the control of the controller 612.

It should also be noted that the FFT engine 800 comprise just one R3-SDF stage, which is identified as SDF3 and is located further down the SDF configuration than SDF6 shown in FIG. 7. For example, to compute either a 3072 or 1536 point FFT, SDF3 is utilized, otherwise, SDF3 is bypassed.

In an exemplary embodiment, the FFT engine 800 is configured to compute FFT results for input sample sequence lengths of 4096, 3072, 1536, 1024, 512, 256, and 128 samples. During operation, the multiplexers are set to route radix results to the appropriate SDF stages. For example, to compute a 4096 point FFT the multiplexers are set to reconfigure the FFT engine 800 so that the sequence of SDF stages is: SDF7 (R2), SDF6 (R2), SDF5 (R2), SDF4 (R2), SDF1 (R2), SDF0 (R2), and FFT block 814 (R64). Thus, the sequence of radix computations results in (2*2*2*2.*2*64)=4096. For example, to compute a 3072 point FFT the multiplexers are set to reconfigure the FFT engine 800 so that the sequence of SDF stages is: SDF7, SDF6, SDF3, SDF1, SDF0, and FFT block 814. For example, to compute a 2048 point FFT the multiplexers are set to reconfigure the FFT engine 800 so that the sequence of SDF stages is: SDF6, SDF5, SDF4, SDF1, SDF0, and FFT block 814. For example, to compute a 1536 point FFT the multiplexers are set to reconfigure the FFT engine 800 so that the sequence of SDF stages is: SDF6, SDF3, SDF1, SDF0, and FFT block 814. For example, to compute a 1024 point FFT the multiplexers are set to reconfigure the FFT engine 800 so that the sequence of SDF stages is: SDF5, SDF4, SDF1, SDF0, and FFT block 814. For example, to compute a 512 point FFT the multiplexers are set to reconfigure the FFT engine 800 so that the sequence of SDF stages is: SDF4, SDF1, SDF0, and FFT block 814. For example, to compute a 256 point FFT the multiplexers are set to reconfigure the FFT engine 800 so that the sequence of SDF stages is: SDF1, SDF0, and FFT block 814. For example, to compute a 128 point FFT the multiplexers are set to reconfigure the FFT engine 800 so that the sequence of SDF stages is: SDF0 and FFT block 814.

Figure 9:
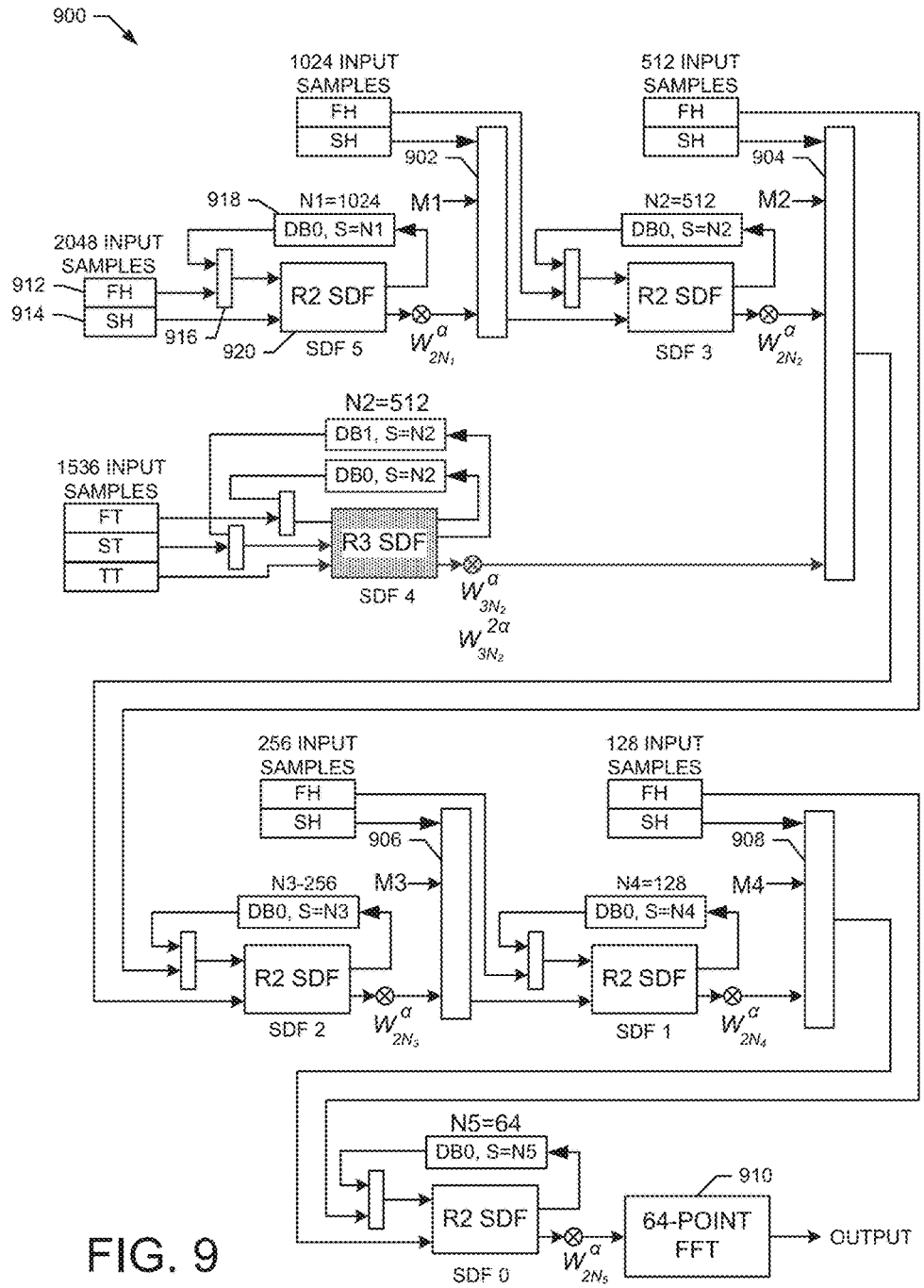
FIG. 9 shows an exemplary embodiment of an FFT engine having a reconfigurable SDF architecture in accordance with one embodiment of the present invention.

FIG. 9 shows an exemplary embodiment of an FFT engine 900 having a reconfigurable SDF architecture in accordance with one embodiment of the present invention. The FFT engine 900 comprises multiplexers 902, 904, 906, and 908, which multiplex various radix results between radix stages to perform the appropriate radix calculations to obtain the desired FFT result. For example, the mux control signals M1-M4 shown in FIG. 9 can be generated by the controller 612 shown in FIG. 6. Furthermore, the input sample sequence can be applied to any selected SDF stage under the control of the controller 612.

It should also be noted that the FFT engine 900 comprise just one R3-SDF stage, which is identified as SDF4. For example, to compute a 1536 point FFT, SDF4 is utilized, otherwise, SDF4 is bypassed.

In an exemplary embodiment, the FFT engine 900 is configured to compute ITT results for input sample sequence lengths of 2048, 1536, 1024, 512, 256, and 128 samples. In an alternative exemplary embodiment, the FFT engine 900 includes modified R2 and R3 SDF configurations that provide for increased processing speed. For example, as illustrated with respect to the modified R2 SDE stage designated SDF5, the 2048 input samples are divided into first half (FH) 912 and second half (SH) 914 and stored in a memory. The first half 912 is input to the mux 916 and the second half 914 is input to the R2 SDF stage (SDF 5). The mux 916 passes the first half 912 to the R2 SDF stage, which performs the radix calculation. The first half of the calculation output is output from the R2 SDF stage. At the same time, the second half of the calculation output is stored in the delay buffer 918. The mux 916 is set to output the second half of the calculation output from the delay buffer after the first half of the calculation output is output. When the second half of the calculation output is output, the weights are applied. Thus, this alternative embodiment of the modified R2 SDF stage is faster than the unmodified R2 SDF stage in that the R2 calculation can start immediately without waiting for any delay buffers to be loaded.

The modified R3 SDF stage identified as SDF4 operates similarly to the modified R2 SDF stage. As illustrated, the 1536 sample input is divided into three portions that are input to the R3 engine together for immediate calculation of the R3 result. The first third of the result is output while the second third is stored in DB0 and the third portion of the result is stored in DB1. As the results from DB0 and DB1 are output, the appropriate twiddle factors are applied. For example, a first set of twiddle factors are applied to the results output from DB0, and a second set of twiddle factors are applied to the results output from DB1. Thus, this alternative embodiment of the modified R3 SDF stage is faster than the unmodified R3 SDF stage in that the R3 calculation can start immediately without waiting for any delay buffers to be loaded.

During operation, the multiplexers are set to route radix results to the appropriate SDF stages. For example, to compute a 2048 point FFT the multiplexers are set to reconfigure the FFT engine 900 so that the sequence of SDF stages is: SDF5 (R2), SDF3 (R2), SDF2 (R2), SDF1 (R2), SDF0 (R2), and FFT block 910 (R64). Thus, the sequence of radix computations results in (2*2*2.*2*2*64)=2048. For example, to compute a 1536 point FFT the multiplexers are set to reconfigure the FFT engine 900 so that the sequence of SDF stages is: SDF4, SDF2, SDF1, SDF0, and FFT block 910. For example, to compute a 102.4 point FFT the multiplexers are set to reconfigure the FFT engine 900 so that the sequence of SDF stages is: SDF3, SDF2, SDF1, SDF0, and FFT block 910. For example, to compute a 512 point FFT the multiplexers are set to reconfigure the FFT engine 900 so that the sequence of SDF stages is: SDF2, SDF1, SDF0, and FFT block 910. For example, to compute a 256 point FFT the multiplexers are set to reconfigure the FFT engine 900 so that the sequence of SDF stages is: SDF1, SDF0, and FFT block 910. For example, to compute a 128 point FFT the multiplexers are set to reconfigure the FFT engine 900 so that the sequence of SDF stages is: SDF0 and FFT block 910.

Figure 10:
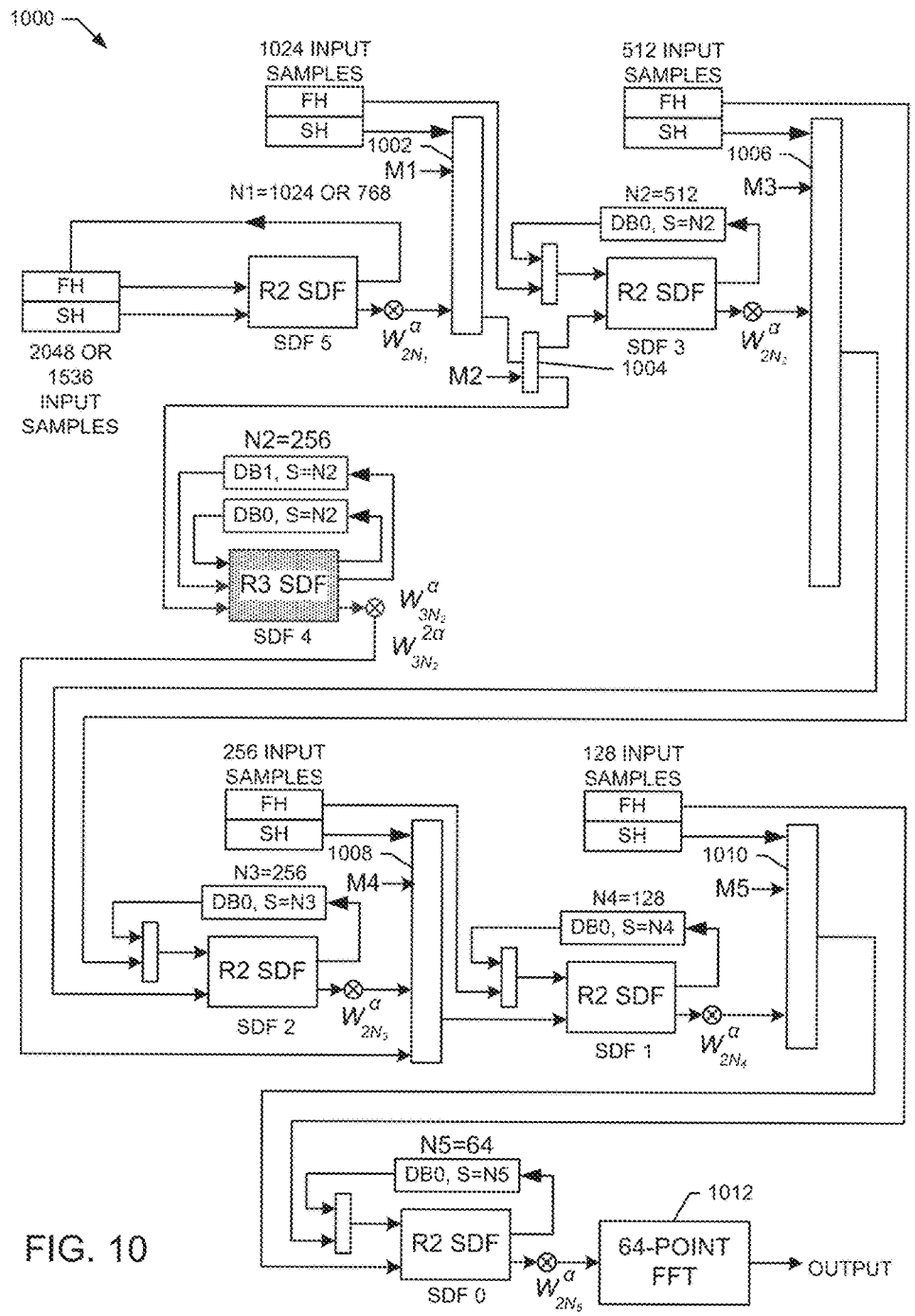
FIG. 10 shows an exemplary embodiment of an FFT engine having a reconfigurable SDF architecture in accordance with one embodiment of the present invention.

FIG. 10 shows an exemplary embodiment of an FFT engine 1000 having a reconfigurable SDF architecture in accordance with one embodiment of the present invention. The FFT architecture 1000 comprises multiplexers 1002, 1004, 1006, 1008, and 1010, which multiplex various radix results between radix stages to perform the appropriate radix calculations to obtain the desired. FFT result. For example, the mux control signals M1-M5 shown in FIG. 10 can be generated by the controller 612 shown in FIG. 6. Furthermore, the input sample sequence can be applied to any selected SDF stage under the control of the controller 612.

It should also be noted that the FFT engine 1000 comprise just one R3-SDF stage, which is identified as SDF4. For example, to compute a 1536 point FFT, SDF4 is utilized, otherwise, SDF4 is bypassed.

In an exemplary embodiment, the FFT engine 1000 is configured to compute FFT results for input sample sequence lengths of 2048, 1536, 1024, 512, 256, and 128 samples. During operation, the multiplexers are set to route radix results to the appropriate SDF stage. For example, to compute a 2048 point FFT the multiplexers are set to reconfigure the FFT engine 1000 so that the sequence of SDF stages is: SDF5 (R2), SDF3 (R2), SDF2 (R2), SDF1 (R2), SDF0 (R2), and FFT block 1012 (R64). Thus, the sequence of radix computations results in (2*2*2*2*2*64) =2048. For example, to compute a 1536 point FFT the multiplexers are set to reconfigure the FFT engine 1000 so that the sequence of SDF stages is: SDE5, SDF4, SDF1, SDF0, and FFT block 1012. For example, to compute a 1024 point FFT the multiplexers are set to reconfigure the FFT engine 1000 so that the sequence of SDF stages is: SDF3, SDF2, SDF1, SDF0, and FFT block 1012. For example, to compute a 512 point FFT the multiplexers are set to reconfigure the FFT engine 1000 so that the sequence of SDF stages is: SDF2, SDF1, SDF0, and FFT block 1012. For example, to compute a 256 point FFT the multiplexers are set to reconfigure the FFT engine 1000 so that the sequence of SDF stages is: SDF1, SDF0, and FFT block 1012. For example, to compute a 128 point FFT the multiplexers are set to reconfigure the FFT engine 1000 so that the sequence of SDF stages is: SDF0 and FFT block 1012.

Figure 11:
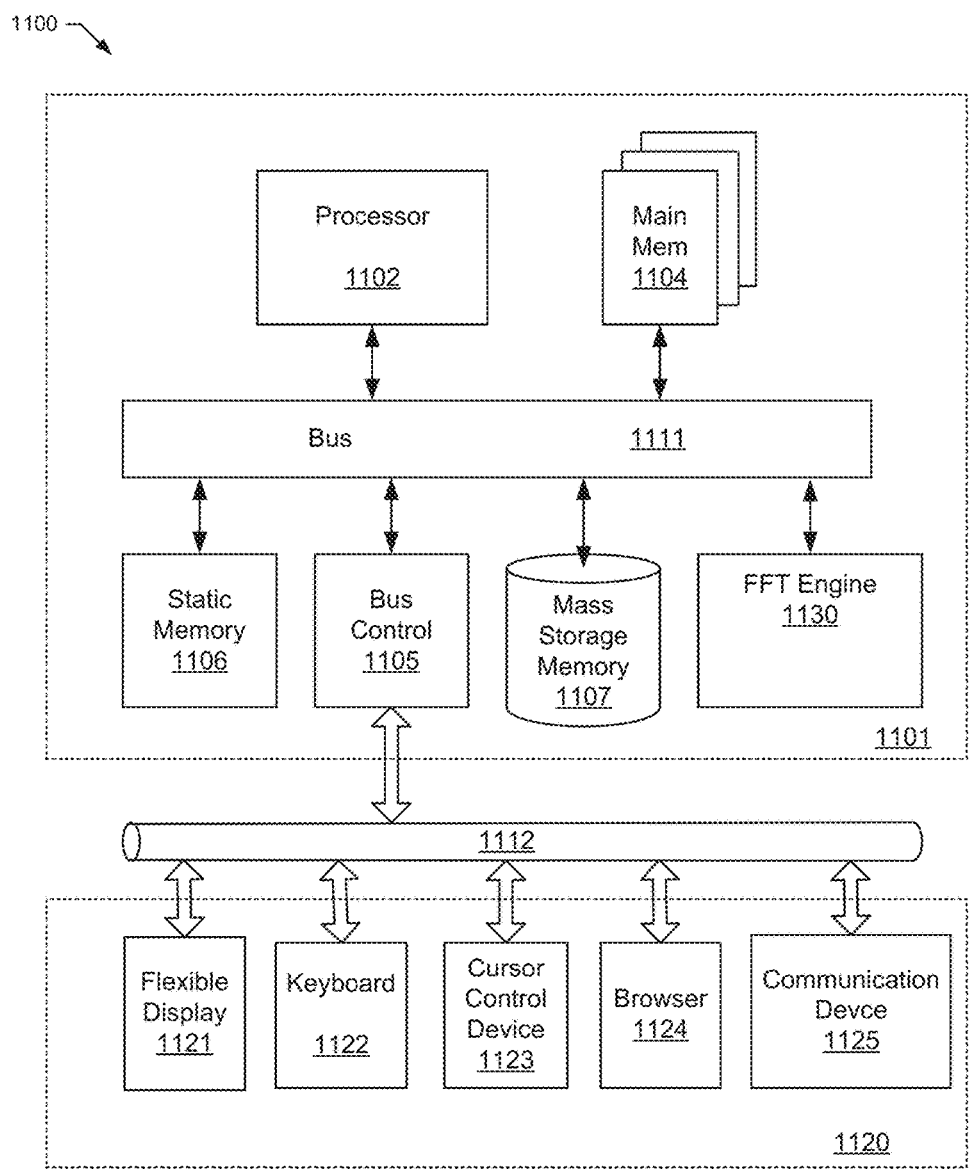
FIG. 11 shows an exemplary embodiment of a front end comprising an exemplary embodiment of an FFT engine having a reconfigurable SDF architecture in accordance with one embodiment of the present invention.

FIG. 11 shows an exemplary embodiment of a FEAB 1100 comprising an exemplary embodiment of an FFT engine 1130 having a reconfigurable SDF architecture in accordance with one embodiment of the present invention. For example, the FEAB 1100 is suitable for use as the FEAB 128 shown in FIG. 1. FEAB 1100 includes a processing unit 1101, an interface bus 1112, and an input/output ("IO") unit 1120. Processing unit 1101 includes a processor 1102, main memory 1104, system bus 1111, static memory device 1106, bus control unit 1105, and mass storage memory 1107. Bus 1111 is used to transmit information between various components and processor 1102 for data processing. Processor 1102 may be any of a wide variety of general-purpose processors, embedded processors, or microprocessors such as ARM® embedded processors, Intel® Core™2 Duo, Core™2 Quad, Xeon®, Pentium™ microprocessor, AMD® family processors, MIPS® embedded processors, or Power PC™ microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Mass storage memory 1107 may be a magnetic disk, solid-state drive ("SSD"), optical disk, hard disk drive, floppy disk, CD-ROM, and/or flash memories for storing large amounts of data.

I/O unit 1120, in one example, includes a display 1121, keyboard 1122, cursor control device 1123, web browser 1124, and communication device 1125. Display device 1121 may be a liquid crystal device, flat panel monitor, cathode ray tube ("CRT"), touch-screen display, or other suitable display device. Display 1121 projects or displays graphical images or windows. Keyboard 1122 can be a conventional alphanumeric input device for communicating information between computer system 1100 and computer operator(s). Another type of user input device is cursor control device 1123, such as a mouse, touch mouse, trackball, or other type of cursor for communicating information between computer system 1100 and user(s).

Communication device 1125 is coupled to bus 1111 for accessing information from remote computers or servers through wide-area network or wireless network. Communication device 1125 may include a modem, a router, or a network interface device, or other similar devices that facilitate communication between FEAB 1100 and the network.

The FEAB 1100 also comprises an exemplary embodiment of an FFT engine 1130. For example, the FFT engine 1130 comprises any of the embodiments of the FFT engine disclosed herein and having a reconfigurable SDF architecture. Thus, the FEAB 1100 utilizes the FFT engine 1130 to compute FFT values for FFT sizes of 128, 256, 512, 1024, 1536, 2048, 3072 and 4096 to support all standard LTE bandwidths.

Figure 12:
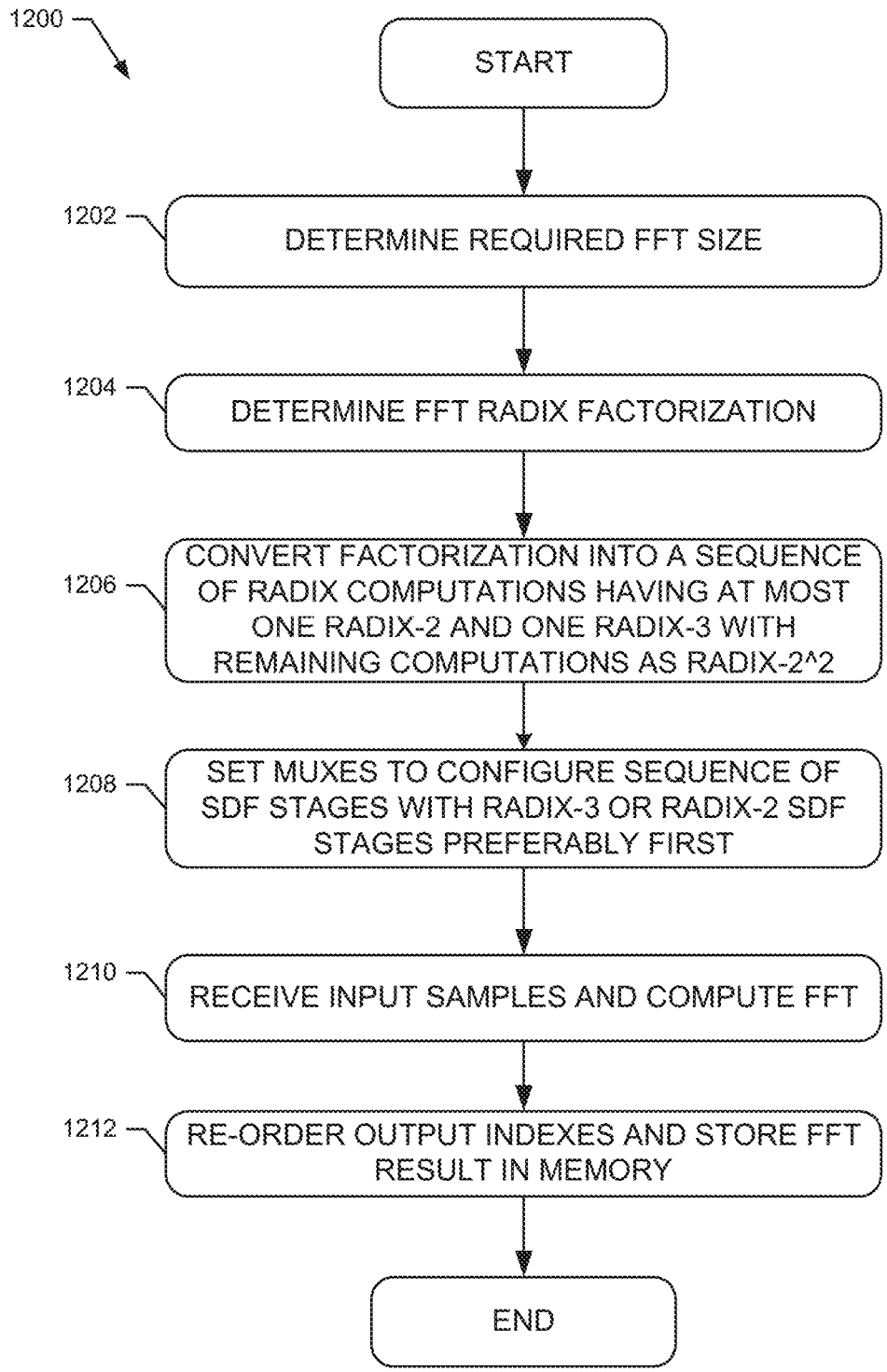
FIG. 12 shows an exemplary embodiment of a method for configuring an FFT engine having a reconfigurable SDF architecture in accordance with one embodiment of the present invention.

FIG. 12 shows an exemplary embodiment of a method 1200 for configuring an FFT engine having a reconfigurable SDF architecture in accordance with one embodiment of the present invention. For example, the FFT engine comprises any of the reconfigurable SDF architectures disclosed herein having radix-2, radix2^2, and radix-3 SDF configurations.

At block 1202, an FFT size is determined. For example, in an exemplary embodiment, the processor 1102 of the FEAB 1100 determines the FFT size to be computed.

At block 1204, a radix factorization is determined. For example, in an exemplary embodiment, the processor 1102 determines the radix factorization to compute the desired FFT.

At block 1206, the radix factorization is converted into a sequence of radix computations comprising radix-2 SDF stages having at most only one radix-3 SDF stage. In another embodiment, the sequence includes at most only one radix-2 SDF stage. The remaining stages comprising radix2^2 stages. For example, in an exemplary embodiment, the processor 1102 of the FEAB 1100 determines the sequence of the radix computations to compute the desired FFT utilizing a selected configuration of SDF stages.

At block 1208, multiplexers are set to reconfigure the FFT engine to arrange the SDF stages into a sequence to compute the desired FFT result. In an exemplary embodiment, the SDF stages are configured with the radix-3 SDF stage preferably in the first position. In another exemplary embodiment, the SDF stages are configured with the radix-2 SDF stage preferably in the first position. For example, in an exemplary embodiment, the controller 612 outputs the multiplexer control signals to set the multiplexers of the FFT engine to appropriately route radix results to the SDF stages. For example, in one embodiment, the FFT engine is the FFT engine 600 and the controller 612 outputs the multiplexer control signals M1-M5 to control the multiplexers to appropriately route radix results to the SDF stages to compute the desired FFT result as indicated in Table 614.

At block 1210, receive input sample sequence and compute an FFT value using the configuration of SDF stages. For example, in an exemplary embodiment, the configuration of the SDF stages is shown in FIG. 6 and the multiplexers and input stage are set as shown in Table 614 to compute a 4096 point FFT.

At block 1212, the output indexes of the FFT result are re-ordered in accordance with the embodiments disclosed below. For example, the method 1400 is performed on the output indexes to generate re-ordered indexes that are used to store the FFT result in a memory.

Thus, the method 1200 operates to configure an FFT engine having a reconfigurable SDF architecture to compute a desired N-point FFT. The output indexes of the FFT result are then re-ordered and these re-ordered indexes are used to store the FFT result in memory. It should be noted that the method 1200 is not limited to the operation shown and one or more of these operations can be modified, added to, deleted, changed, rearranged or otherwise revised within the scope of the embodiments.

FFT Output Reordering

Due to the frequency decimation applied, the output FFT samples are generated in bit-reversed order. Hence, to re-order the output samples a bit-reversed re-indexing has to be performed. For example, assuming the binary representation for the index value i is represented as $(b_{L-1}, \ldots b_1 b_0)_2$ Hence, the output at sample i should be re-ordered to a sample at index j which is the bit-reversed version of i as $j=(b_0 b_1 \ldots b_{L-1})_2$. This applies for scenarios where the FFT size is only a factor of 2 ($N=2^p$). The above rule does not apply when the FFT size has a factor of 3 (e.g., $N=2^p \times 3^q$). As a result, a look up table might be needed to perform the re-ordering, which utilizes additional resources and may offer slow performance.

In an exemplary embodiment, apparatus and method are disclosed to reorder the output FFT sequence to obtain the re-ordered indexes for cases where the FFT size is $N=3 \times M$ and $M=2^p$. For example, in an exemplary embodiment, the apparatus and method operate to re-order the FFT output sample index "fft_out_idx" to its correct position at sample index "target_idx". In an exemplary embodiment, the following pseudocode can be used to obtain the "target_idx" values.

int M=N/3;
    //Hence $M=2^p$
    int idx_res=fft_out_idx % M;
    //This is a simple "modulo" operation to determine remainder
    int idx_div=fft_out_idx/M;

```
//This is a simple right shift by p to compute division
   result
int bit_reverse_base_2 fft_bit_reverse (idx_res);
//This is the simple bit-reverse for R2, "0<=idx_res<2^p"
int target_idx=3*bit_reverse_base_2+idx_div;
//This computes final result
```

In the above pseudocode, the bit-reverse of the division residual of fft_out index to 3 is obtained. It is then multiplied by 3 and added to the division result of fft_out index to 3. As explained in the pseudocode, the division and residual operations are obtained very easily using "right shift" and "AND" operations, respectively.

Figure 13:
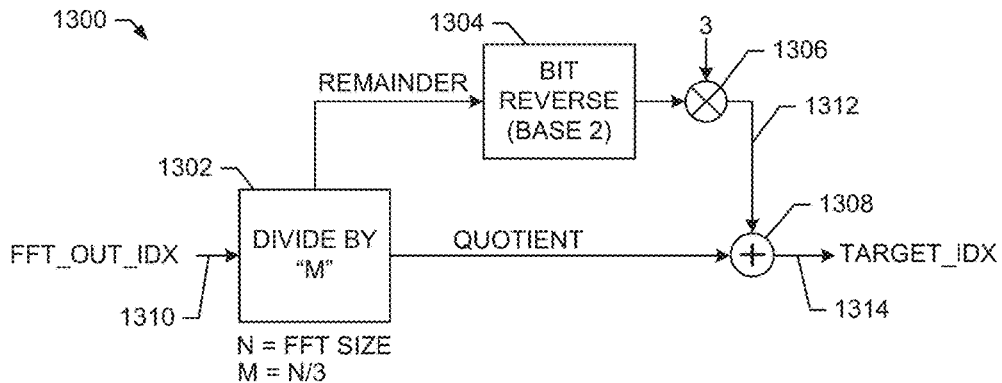
FIG. 13 shows an exemplary embodiment of an apparatus that re-orders FFT output indexes in accordance with one embodiment of the present invention.

FIG. 13 shows an exemplary embodiment of an apparatus 1300 that re-orders FFT output indexes in accordance with one embodiment of the present invention. The apparatus 1300 comprises a divide block 1302, bit reverse block 1304, multiplier 1306, and adder 1308. In an exemplary embodiment, each of the blocks and/or components of the apparatus 1300 comprise at least one of a processor, CPU, state machine, discrete logic, hardware, memory and/or other suitable components.

During operation, FFT output indexes 1310 are received at the divide block 1302. The divide block 1302 divides the received indexes by a value "M", which is the FFT size N divided by three. Thus, M=N/3. The division result (Quotient) is output from the divide block 1302 and input to the multiplier 1308. A remainder is output from the divide block 1302 and input to the bit reverse block 1304. The bit reverse block 1304 operates to reverse the bit positions of the remainder input. A bit-reversed output is then input to the multiplier 1306. The multiplier 1306 multiplies the bit-reversed output by "3" and provides the result 1312 to the multiplier 1308. The multiplier 1308 multiplies the division result with the result output from the multiplier 1306 to generate the target index 1314 output result.

Figure 14:
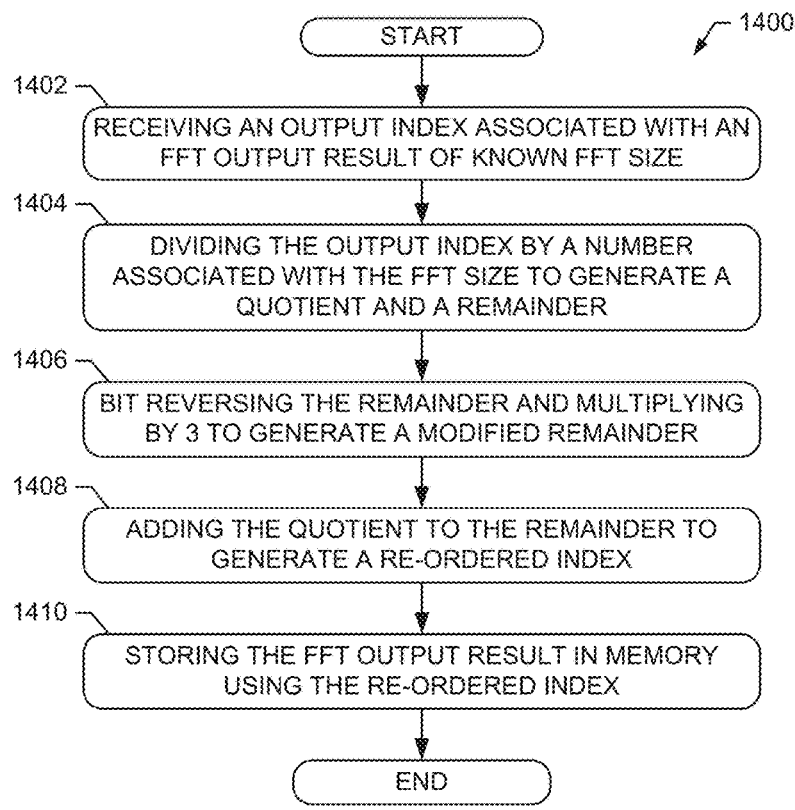
FIG. 14 shows an exemplary embodiment of a method for re-ordering WI output indexes in accordance with one embodiment of the present invention.

FIG. 14 shows an exemplary embodiment of a method 1400 for re-ordering FFT output indexes in accordance with one embodiment of the present invention. In an exemplary embodiment, the method 1400 is suitable for use with the apparatus 1300 shown above.

At block 1402, a sequence of FFT output indexes is received that are associated with a specific size FFT operation. For example, the size (N) of the FFT operation that generates the output samples is known. For example, in an exemplary embodiment, the indexes 1310 are received at the divide block 1302.

At block 1404, the indexes are divided by a value "M" that is derived from the FFT size. In an exemplary embodiment, M≤N/3. The value of M is divided into the received indexes to generate a division result and a remainder. For example, in an exemplary embodiment, the divide block 1302 divides the received indexes 1310 by the value of M to generate the division result (Quotient) that is input to the multiplier 1308 and the remainder that is input to the bit reverse block 1304.

At block 1406, the remainder is modified with a base-2 bit-reversal to produce a bit reversed result. For example, in an exemplary embodiment, the bit reverse block 1304 operates to bit reverse the remainder to generate a bit-reversed remainder that is input to the multiplier 1306, which multiplies the bit-reversed remainder by 3 to generate result 1312.

At block 1408 the modified remainder and division result are merged to generate target index value. In an exemplary embodiment, the adder 1308 adds the input it receives from the multiplier 1306 (e.g., result 1312) with the division result (Quotient) to generate target index values 1314, which represent the re-ordered index values.

Thus, the method 1400 operates to reorder indexes associated with output values of an FFT result. It should be noted that the method 1400 is not limited to the operation shown and one or more of these operations can be modified, added to, deleted, changed, rearranged or otherwise revised within the scope of the embodiments.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. An apparatus configured to generate time domain samples for transmitting information across a communication network utilizing one or more Fast Fourier Transform (FFT) engines for time to frequency domain conversion, the apparatus comprising:
   a radix-2 (R2) single delay feedback (SDF) stage that generates a radix-2 output;
   a radix-3 (R3) SDF stage that generates a radix-3 output;
   one or more radix-2 squared (R2^2) SDF stages that generate a radix-4 output;
   a controller that configures a sequence of radix stages selected from the R2, R3, and R2^2 stages based on an FFT point size to form an FFT engine, wherein the FFT engine receives input samples at a first stage of the sequence and generate an FFT output result that is output from a last stage of the sequence, and wherein the sequence includes no more than one R3 stage;
   a divider that divides an FFT output index associated with the FFT output result by a number associated with the FFT point size, wherein the divider generates a quotient and a remainder;
   a bit reverser that bit reverses the remainder to generate a bit reversed remainder;
   a multiplier that multiplies the bit reversed remainder by three (3) to generate a modified remainder; and
   an adder that adds the quotient to the modified remainder to generate a re-ordered index for the FFT output result.

2. The apparatus of claim 1, wherein the R3 stage is selected to be the first stage.

3. The apparatus of claim 2, wherein the sequence further includes no more than one R2 stage.

4. The apparatus of claim 3, wherein the FFT point size is selected from a group of FFT point sizes comprising 4096, 3072, 2048, 1536, 1024, 512, 256, 126, and 64 point sizes.

5. The apparatus of claim 1, wherein the R2 stage comprises a modified R2 stage comprising two ports that receive selected input samples.

6. The apparatus of claim 1, wherein the R3 stage comprises a modified R3 stage comprising three ports that receive selected input samples.

7. The apparatus of claim 1, further comprising one or more multiplexers within the sequence, wherein each multiplexer selects an output signal from two or more input signals based on a multiplexer control signal, and wherein the output signal is input to a next stage of the sequence.

8. The apparatus of claim 7, wherein the controller generates the multiplexer control signal for each multiplexer.

9. The apparatus of claim 8, wherein the controller generates the multiplexer control signal to configure the FFT engine to compute a 4096 point FFT result, and wherein the sequence comprises serially connected stages in the following order from first to last: R2^2, R2^2, R2^2, R2^2, R2^2, and R2^2.

10. The apparatus of claim 8, wherein the controller generates the multiplexer control signal to configure the FFT engine to compute a 3072 point FFT result, and wherein the sequence comprises serially connected stages in the following order from first to last: R3, R2^2, R2^2, R2^2, R2^2, and R2^2.

11. The apparatus of claim 8, wherein the controller generates the multiplexer control signal to configure the FFT engine to compute a 2048 point FFT result, and wherein the sequence comprises serially connected stages in the following order from first to last: R2, R2^2, R2^2, R2^2, R2^2, and R2^2.

12. The apparatus of claim 8, wherein the controller generates the multiplexer control signal to configure the FFT engine to compute a 1536 point FFT result, and wherein the sequence comprises serially connected stages in the following order from first to last: R3, R2, R2^2, R2^2, R2^2, and R2^2.

13. The apparatus of claim 8, wherein the controller generates the multiplexer control signal to configure the FFT engine to compute a 1024 point FFT result, and wherein the sequence comprises serially connected stages in the following order from first to last: R2^2, R2^2, R2^2, R2^2, and R2^2.

14. The apparatus of claim 8, wherein the controller generates the multiplexer control signal to configure the FFT engine to compute a 512 point FFT result, and wherein the sequence comprises serially connected stages in the following order from first to last: R2, R2^2, R2^2, R2^2, and R2^2.

15. The apparatus of claim 8, wherein the controller generates the multiplexer control signal to configure the FFT engine to compute a 256 point FFT result, and wherein the sequence comprises serially connected stages in the following order from first to last: R2^2, R2^2, R2^2, and R2^2.

16. The apparatus of claim 1, wherein the communication network includes at least one user equipment (UE), a radio tower, a switching network, and a front end accelerator block (FEAB).

17. A method for generating time domain samples for transmitting wireless information utilizing one or more Fast Fourier Transform (FFT) engines to provide time to frequency domain conversion via a communication network, the method comprising:
   determining an FFT point size of a FFT output result to be computed;
   factoring the point size into a factorization having factors of 2, 3, and 4;
   configuring a sequence of radix stages selected from R2, R3, and R2^2 single delay feedback (SDF) stages corresponding to the factors of the factorization to form an FFT engine, wherein the FFT engine receives input samples at a first stage of the sequence and generates the FFT output result that is output from a last stage of the sequence, and wherein the sequence includes no more than one R3 stage;
   dividing an FFT output index associated with the FFT output result by a number associated with the FFT point size, wherein the dividing generates a quotient and a remainder;
   bit reversing the remainder to generate a bit reversed remainder;
   multiplying the bit reversed remainder by three (3) to generate a modified remainder; and
   adding the quotient to the modified remainder to generate a re-ordered index for the FFT output result.

18. The method of claim 17, wherein the FFT point size is selected from a group of FFT point sizes comprising 4096, 3072, 2048, 1536, 1024, 512, 256, 126, and 64 point sizes.

19. The method of claim 17, wherein the configuring comprises configuring the FFT engine to compute a 3072 point FFT output result, and wherein the sequence comprises serially connected stages in the following order from first to last: R3, R2^2, R2^2, R2^2, R2^2, and R2^2.

20. The method of claim 17, further comprising selecting the R3 stage to be the first stage.

21. The method of claim 17, further comprising modifying an R2 stage having two ports configured to receive selected input samples.

22. The method of claim 17, wherein the communication network includes at least one user equipment (UE), a radio tower, a switching network, and a front end accelerator block (FEAB).

* * * * *